Feb. 18, 1969  G. ALTSON  3,428,017
PHANTOM DRIVE

Filed Sept. 16, 1966  Sheet 1 of 2

INVENTOR
GEORGE ALTSON

BY Semmes & Semmes
ATTORNEYS

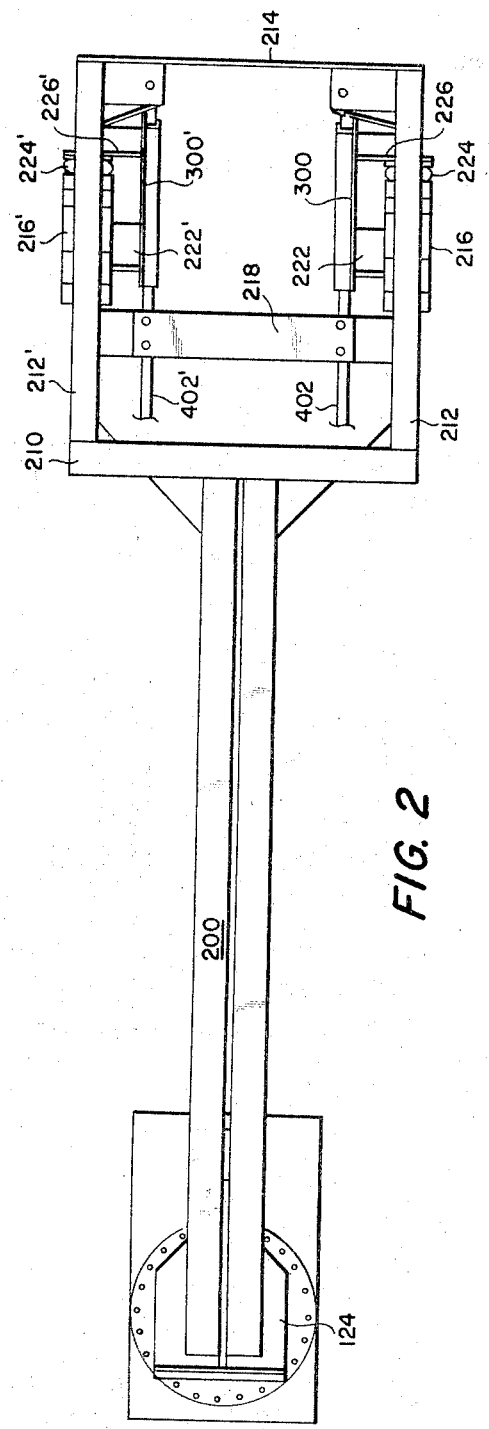
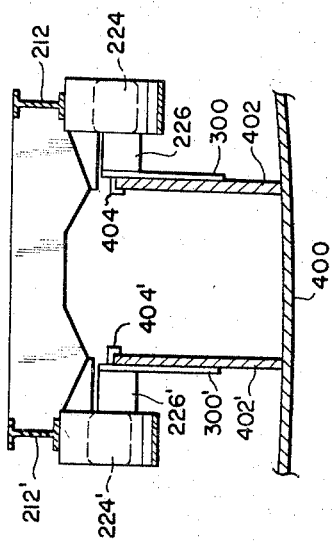

United States Patent Office 3,428,017
Patented Feb. 18, 1969

3,428,017
PHANTOM DRIVE
George Altson, 45½ E. Main St.,
Clifton Springs, N.Y. 14432
Filed Sept. 16, 1966, Ser. No. 579,890
U.S. Cl. 115—34   9 Claims
Int. Cl. B63h 5/06, 1/14; B63b 3/00

ABSTRACT OF THE DISCLOSURE

Watercraft suspension system controlling vibration of propulsion system, particularly propeller shaft. A frame is resiliently secured to a hull. The propeller shaft is mounted directly on the frame and moves with the frame independently of the hull.

---

This invention relates generally to the field of craft propulsion and more particularly to the propulsion of marine craft in which the driving means comprises an engine, a drive shaft, and a propeller.

Such propeller-driven vessels are often disposed to problems resulting from vibration. The propulsion unit is the source of this vibration. Conventional mounts do little or nothing toward reducing or even isolating these vibrations and usually act to transmit the vibration impulses from the propulsion unit to the hull and throughout the vessel. When the metal portions of the vessel are subjected to long periods of severe vibration, they may eventually rupture. Once a rupture has started, it progresses rapidly. Metals weakened by vibration are most likely to rupture when a storm-racked hull imposes additional stresses.

The engine is a primary source of this vibration. Much has been done toward the isolation of vibration originating in this element, however very little has been suggested toward the elimination of the vibratory impulses from a less obvious source, the propeller shaft. Shaft misalignment of a few thousandths of an inch causes vibration in combination with generation of heat. As heat lowers the tensile strength of the shaft, the vibration causes metal fatigue, and in extreme cases the shaft will rupture under its huge torsional load.

As the shape of the hull changes, the alignment of the propeller shaft requires adjustment. Such hull shape changes occur at the time of launching and thereafter as the vessel is loaded or unloaded. Conventional mounts provide for a certain amount of realignment as the hull shape changes during these operations, but if consideration is given to a vessel plying through heavy seas, the problem of maintaining shaft alignment is much more complex. Here, a hull flexes continually and it is almost impossible to maintain perfect alignment through the means of adjustment provided by conventional mounting systems.

My invention is concerned with an apparatus through which the vibration of the propulsion system and particularly that of the propeller shaft may be controlled to eliminate a number of hazardous conditions. This will become apparent from the following specification and attached drawings which describe my invention.

The object of this invention is to provide an apparatus which will eliminate propeller shaft vibration through the maintenance of proper shaft alignment. This device can be used on all propeller-driven vessels in which the motor unit is internally located and the propeller shaft is extended through the hull of the vessel.

Another object of this invention is to describe a device which acts to isolate the propulsion unit vibration which is not eliminated by the maintenance of proper shaft alignment, particularly engine vibration.

Another object of this invention is to provide an apparatus by which the dangers of ruptured fuel tanks and lines, steam lines, the failure of navigational and communications equipment, and even the rupture of the propeller shaft is materially lessened, thereby permitting faster, more efficient, and finally safer operation of marine craft.

Another object of this invention is to provide a device for the elimination of hazards due to propulsion unit vibration which can be easily adapted to a great variety of hull shapes and transmission designs.

These and other objects of the invention will be apparent from the following specification and drawings, in which:

FIGURE 2 is a top plan of same;

FIGURE 3 is a cross-sectional view of the forward air cushion mounting structure and the supported carriage taken along direction lines 3—3.

FIGURES 1 and 2 illustrate the general configuration of the propulsion unit mounting device as comprising a unit of the type carriage supported by air cushions.

Figure 1:
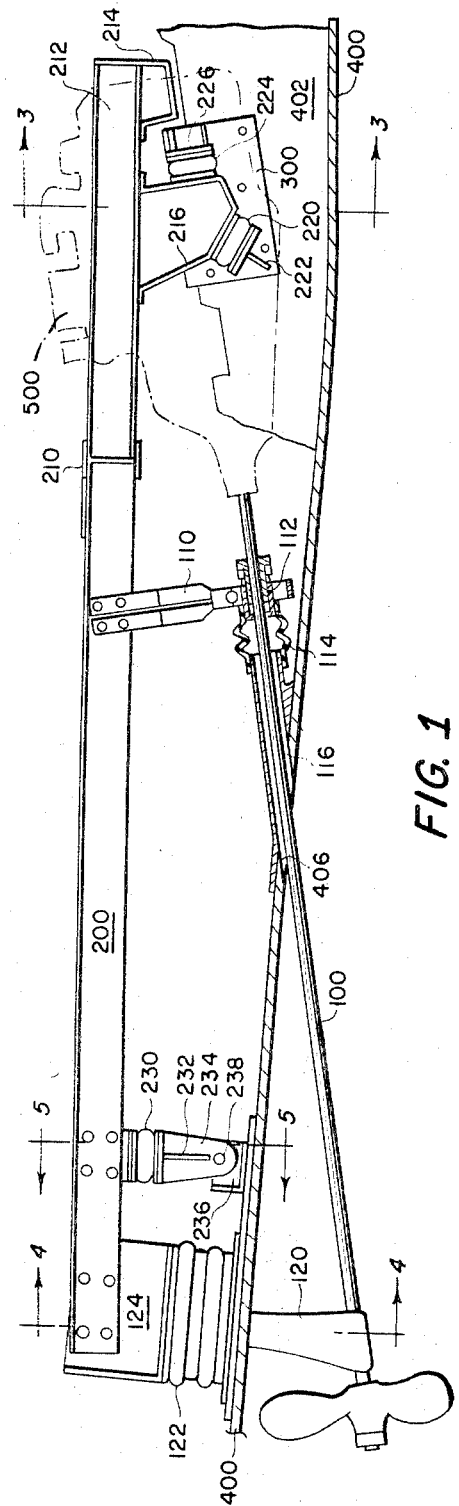
FIGURE 1 is a sectional view through the vertical center line of the propulsion unit as it is supported by the mounting device.
Figure 5:
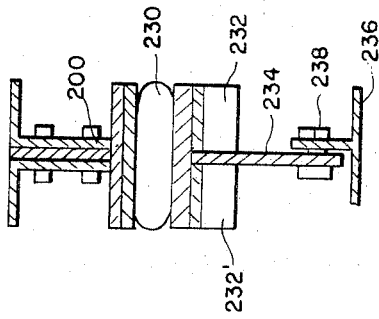
FIGURE 5 is a cross-sectional view of the aft air cushion and its mounting means taken along direction lines 5—5.
Figure 4:
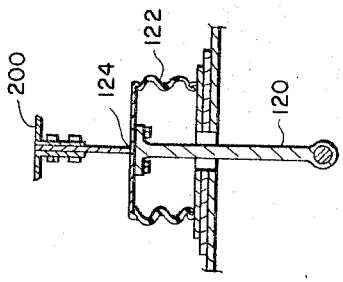
FIGURE 4 is a cross-sectional view of the propeller strut and the gland mount taken along direction lines 4—4.

This carriage comprises an aft beam 200 which is attached to the propeller shaft by propeller strut 120 and stuffing box bracket 110. Propeller strut 120 is attached to aft beam 200 by gland cover bracket assembly 124 and extends through the hull by means of water type, flexible gland 122. This assembly permits the strut considerable freedom of movement and eliminates usual direct contact with the hull. Stuffing box bracket 110 is attached to stuffing box 112, which by means of stuffing box gland 114 also permits limited shaft movement.

Aft beam 200 is rigidly attached to a forward rectangular structure comprising I-beam 210, I-beams 212 and 212', and mounting plate 214. Thrust and load brackets 216 and 216' are attached to I-beams 212 and 212' at approximately their mid-section. Engine supporting strap 218 is secured to I-beams 212 and 212' near their stern ends. The general configuration of the complete structure is illustrated in FIGURES 1 and 2.

The aft beam 200 is situated directly above the propeller shaft 100 in a roughly horizontal condition. The propeller shaft 100 is extended down through shaft alley 116 through aperture 406 in hull 400. The carriage structure and the propulsion unit comprising propeller shaft 100 and engine 500 as they are connected by propeller strut 120, stuffing box bracket 110, engine support strap 218, and mounting plate 214 thus form a semi-rigid three sided rectilinear. This unit is isolated from the hull by means of a special suspension system.

The carriage structure is supported at its forward end by a tandem combination of four air cushions. Air cushions 220 and 220' are supported on T-plates 222 and 222'. These T supports are rigidly attached to air cushion assembly mounting plates 300 and 300', which plates are secured to motor bed positions 404 and 404'. T supports 222 and 222' slope from horizontal at an approximately equal but opposite angle from that of the propeller shaft. The thrust and load brackets 216 and 216' are supported at their lower rearmost surfaces by air cushions 220 and 220'. The beveled supports cause air cushions 220 and 220' to exert both a large vertical pressure component in the upward direction and a small horizontal pressure component in the forward direction.

Air cushions 224 and 224' are supported by brackets 226 and 226' which brackets are attached to air cushion mount assembly plates 300 and 300' at an angle perpendicular to that of the propeller shaft. The carriage structure is supported by air cushions 224 and 224' as they are applied to the thrust load brackets 216 and 216' at their forward surfaces. Air cushions 224 and 224' are thus exerting large pressure components in the stern direction and small pressure components in the downward direction.

The stern section of the carriage structure, i.e. the stern section of the aft beam is supported by air cushion 230. Air cushion 230 rests on T-irons 232 and 232', which T-irons are rigidly attached to plate 234. Plate 234 is rotatably secured in aft cushion base bracket 236, by bolt 238.

From the above specification and attached drawings, it is seen that the combination of cushions 224 and 224' and 222 and 222' as they are arranged in tandem, not only support a static load but are also spaced to resist engine torque. The mounting of stern cushion 230 is so arranged that it may absorb lateral vertically vibrationary impulses, but is free to pivot fore and aft. Thus, the forward propeller thrust is absorbed by the two forward cushions and is free of any restraint from the stern cushion. No couple of forces tending to twist the carriage has been established, and the full power of the engines is utilized for boat propulsion. It is also seen that the entire weight of the carriage and the propulsion unit is transferred by cushions to the top of the engine bed. There is no localized loading of the hull.

It is also evident that the propulsion unit has no direct contact with the hull of the vessel. It is supported completely by the air cushion suspension system. As this suspension system absorbs vibration impulses, propulsion unit vibration is not transmitted to the hull.

A further advantage of my invention is that it allows propeller shaft alignment to be constantly maintained. After the initial aligning process, the alignment is not subject to the changes besetting the rigid mounting. As the vessel is launched, the hull assumes the waterborne shape. The tough yet resilient glands, because of their concertina-like shape, permit very large relative motion between the hull and the carriage without applying a load of any consequence on the carriage. The cushions then gently push the whole propulsion unit into a new relationship with the hull. The propulsion unit is supported at five points. Whatever change of form that the hull may assume, either through the change in static load, through forward motion of the vessel, or through the wracking of the hull in heavy seas, the propulsion unit remains static.

The installation of this system requires only minor alterations to the hull. The slot for the propeller strut must be elongated and the angular hole through the hull where the propeller shaft passes through it must be enlarged in order to permit clearance at all times. The top of the engine bed may also have to be reshaped. Thus, another advantage of my invention is that it is relatively easy to install.

It is further possible to apply the suspension system to many different sorts of propulsion units without extensive alteration of engines, mounting brackets, propeller shafts or propellers. It can further be applied to propulsion units for vessels of all sizes.

Although this specification has referred to the supporting means particularly as air cushions, any suspension means may be used, for example, springs, hydraulics, etc.

Having thus described my invention, I claim the following:

1. A watercraft having a power source located within the hull of the craft and connected to a propulsion element exterior to said hull by drive means, the improvement comprising a suspension system, including a unit body carriage, means engaging the carriage with the power source and drive means, resilient suspension means connecting the unit body carriage to the hull such that thrust in line with the drive means, torque and weight are absorbed assuring that no couple of forces exists tending to twist or upset the carriage within the hull and means rigidly mounting the drive means near the propulsion element to the carriage, together with sealing means between the hull and carriage allowing for any combination of angular and offset misalignment.

2. A watercraft as in claim 1, wherein the resilient suspension means includes a first cushion assembly mounted parallel to the drive means.

3. A watercraft as in claim 2, wherein the resilient suspension means further includes a second cushion assembly positioned vertically.

4. A watercraft as in claim 3, including means permitting the second cushion assembly to pivot about the hull.

5. A watercraft as in claim 1, wherein the means rigidly mounting the propulsion element to the carriage includes a strut attached to the carriage by a gland cover assembly extending through the hull joining a water type flexible gland secured to the hull, the gland constituting the sealing means.

6. A watercraft as in claim 3, wherewith unit body carriage includes an aft beam to which the second vertical cushion assembly connecting the carriage and the hull is secured, together with means securing the drive means to the aft beam.

7. A watercraft as in claim 6, wherein the unit body carriage further includes a forward mounting unit rigidly attached to the aft beam to which the power source is engaged.

8. A watercraft as in claim 7, wherein the resilient suspension means includes a third cushion assembly, the first and third cushion assemblies being interposed between the forward mounting unit and the means engaging the carriage with the power source.

9. A watercraft as in claim 8, wherein the first and third cushion assemblies comprise a tandemly arranged combination of four suspension cushions supporting the forward mounting unit.

References Cited

UNITED STATES PATENTS

| | | | |
|---|---|---|---|
| 1,948,744 | 2/1934 | Curtiss. | |
| 1,948,745 | 2/1934 | Curtiss. | |
| 2,002,517 | 5/1935 | Balduf | 115—34 |
| 2,103,087 | 12/1937 | Morris | 114—65 |
| 2,107,606 | 2/1938 | Gemmer. | |
| 2,814,352 | 11/1957 | Muller. | |

TRYGVE M. BLIX, *Primary Examiner.*

U.S. Cl. X.R.

114—65